United States Patent [19]

Kundler et al.

[11] 4,374,423
[45] Feb. 15, 1983

[54] ARRANGEMENT FOR MONITORING A RUDDER CONTROL SYSTEM

[75] Inventors: Walter Kundler, Hamburg; Reinhold Pientak, Dänischenhagen; Claus Schulz, Altenholz-Klausdorf; Wolfgang Skerka, Rendsburg, all of Fed. Rep. of Germany

[73] Assignee: Anschütz & Co. GmbH, Kiel-Wik, Fed. Rep. of Germany

[21] Appl. No.: 193,404

[22] PCT Filed: Aug. 13, 1979

[86] PCT No.: PCT/DE79/00083
§ 371 Date: Apr. 30, 1980
§ 102(e) Date: Apr. 30, 1980

[87] PCT Pub. No.: WO80/00506
PCT Pub. Date: Mar. 20, 1980

[30] Foreign Application Priority Data

Aug. 30, 1978 [DE] Fed. Rep. of Germany ....... 2837842

[51] Int. Cl.³ ............... G06F 15/50; G05B 23/02; G05B 11/42
[52] U.S. Cl. .................... 364/434; 244/194; 318/563; 364/163; 364/166; 364/185; 364/457
[58] Field of Search ............. 364/457, 424, 432, 434, 364/443, 105, 118, 119; 318/563, 565, 580, 584, 585, 586, 588, 610, 616; 244/87, 175, 179, 180, 181, 184, 192, 194, 195; 114/162, 163, 144 E, 144 A, 144 B; 340/30

[56] References Cited

U.S. PATENT DOCUMENTS

| | | | |
|---|---|---|---|
| 3,390,614 | 7/1968 | Tatum | 318/563 X |
| 3,454,752 | 7/1969 | Zavod | 364/118 |
| 3,634,746 | 1/1972 | Strege, Sr. | 318/565 |
| 3,925,640 | 12/1975 | Duggan | 364/118 |
| 4,078,750 | 3/1978 | Tomlinson | 318/563 X |
| 4,209,734 | 6/1980 | Osder | 318/565 X |

*Primary Examiner*—Joseph F. Ruggiero
*Attorney, Agent, or Firm*—Frishauf, Holtz, Goodman & Woodward

[57] ABSTRACT

Signals from a rudder position setting control and from a rudder position sensor constitute the only electrical information sources needed for operating a monitoring system for a rudder control that produces an alarm when the rudder control does not function effectively. The difference between the desired rudder setting and the actual rudder position, generated by a differential amplifier, is fed to a bi-directional limit circuit and a differentiating circuit is used to generate a signal corresponding to the rate of change of rudder position, which signal is likewise provided to a bi-directional limit circuit. The limit circuit outputs relating to the same polarity of error correction activate logic in an evaluation circuit so as to produce an alarm drive signal if the error signal exceeds the limit, while the rate of change of the rudder position signal for the proper direction of correction does not rise to the prescribed threshold, but the alarm generator is not enabled unless an error signal exceeding the limit persists for a predetermined period of time.

4 Claims, 1 Drawing Figure

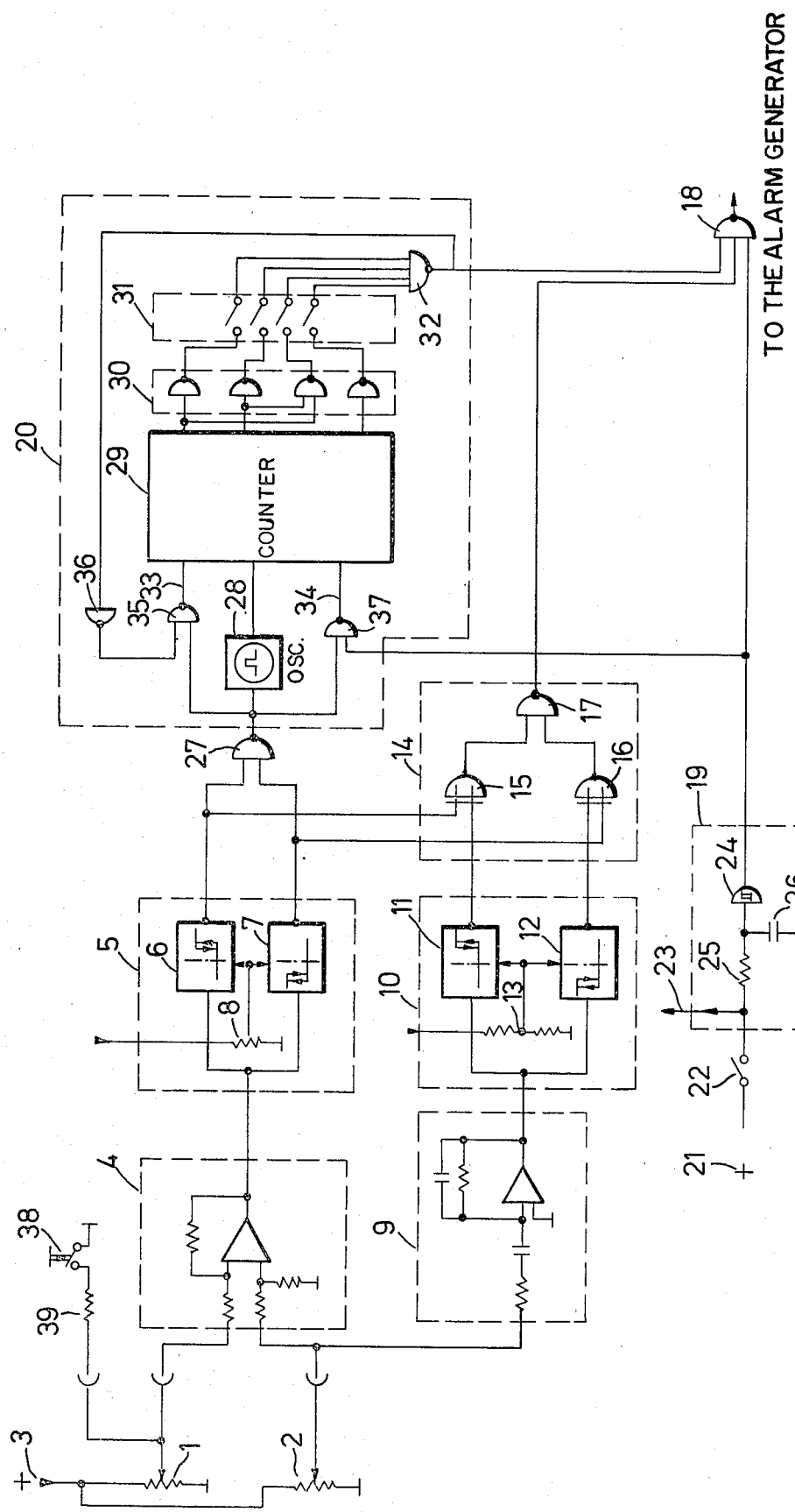

ARRANGEMENT FOR MONITORING A RUDDER CONTROL SYSTEM

The invention relates to an arrangement for monitoring a rudder control system, containing a transmitter for generating a set-point signal corresponding to the respective desired angular position of the rudder and facilities for turning the rudder subsequently into the angular position provided by the set-point signal, the actual angular position of the rudder being picked up by a receiver which supplies a corresponding control-point signal.

In a rudder control system working according to the principle of displacement control the desired rudder angle is preset by appropriately turning a handwheel provided on the bridge. An angle transmitter, which can be actuated by the handwheel, supplies a set-point signal corresponding to the desired angular position of the rudder. The steering system of the rudder control system responds to the set-point signal and causes the steering gear to turn the rudder into the angular position preset by the set-point signal. If due to faulty operation of the steering system the rudder is not adjusted according to the preset set-point signal, this has to be indicated as quickly as possible.

From German Offenlegungsschrift No. 27 24 990 a monitoring arrangement of the type mentioned initially is already known in which a signal is simulated, with the aid of an analog computer, which reproduces the rudder movement to be expected with a preset set-point signal. The actual position of the rudder is picked up by an angle receiver, using measuring techniques. The control-point signal supplied by the angle receiver is compared with the simulated signal supplied by the analog computer circuit and an alarm is triggered if the difference between the two signals exceeds a preset amount. In order to ensure reliable operation, the individual components of the analog computer circuit provided for simulating the rudder movement must be matched, with respect to their behaviour, as exactly as possible to the behaviour of the mechanical components of the rudder control system. In particular, with selective operation of the steering gear with one or several pumps the analog computer circuit must be switched over accordingly.

It is the object of the invention to produce a monitoring arrangement of the type mentioned initially, in which for the purpose of reliably triggering an alarm only the set-point signal corresponding to the desired angular position and the control-point signal corresponding to the actual angular position are being employed.

This object is achieved by a design of the type mentioned initially which, according to the invention, is characterized by a first limit circuit to which the difference between the set-point signal and the control-point signal is applied and which supplies an error signal if the applied difference between the set-point signal and the control-point signal exceeds a predetermined limit, a differentiating section to which the control-point signal is applied, a second limit circuit, following the differentiating section, which supplies an error signal as long as the rate of change, corresponding to the turning rate of the rudder, of the control-point signal is below a predetermined minimum value, an evaluation circuit to which the output signals of the two limit circuits are applied and which supplies a drive signal for an alarm generator if two error signals are present, provided the error signals do not indicate the condition that the rudder is moving in the direction which reduces the angular difference between the set-point and the control-point signal, and a timing section which enables the alarm generator to be triggered by a drive signal, present at the output of the evaluation circuit, only after a predetermined period of time has elapsed.

In the monitoring arrangement according to the invention, the angular difference between the nominal position and the actual position of the rudder and simultaneously also the rate of turning of the rudder is determined continuously. If the angular difference exceeds a predetermined value and the rate of turning of the rudder, after a waiting period predetermined under consideration of the run-up time for the steering gear, has still not reached a certain minimum value, the alarm is triggered. If the rudder control system is operationally faulty, therefore, the operating personnel is warned in time because of the angular difference and the rate of turning of the rudder, picked up by using measuring techniques. There is no alarm if the rudder is being turned by the rudder control system, after a predetermined run-up period, at a certain minimum speed into the direction which reduces the angular difference between the set point and the control point.

Appropriate developments of the subject of the application are being claimed in the sub-claims.

The invention is now explained with the aid of the drawing which shows a block diagram of an embodiment of the invention.

The potentiometer 1, used as angle transmitter, is adjusted, during the adjustment of the handwheel provided on the bridge, in the same manner as the angle transmitter of the rudder control system. Another potentiometer 2 is used as angle receiver which is adjusted in accordance with the rotation of the rudder shaft. The two potentiometers 1 and 2 are supplied with direct voltage by a direct voltage source 3. The tap on the potentiometer 1 delivers an input voltage, which corresponds to the set-point angle preset by the handwheel, to the one input of a differential amplifier 4 whilst the tap on the potentiometer 2 delivers an input voltage corresponding to the actual angular position of the rudder to the other input of the differential amplifier 4. At the output of the differential amplifier 4 a voltage appears the amplitude and polarity of which is a function of the angular difference between the set-point angle preset by the angle transmitter and the control-point angle of the rudder picked up by the angle receiver. The output voltage of the differential amplifier 4 is applied to the input of a limit circuit 5 which supplies an error signal if the angular difference between the angle transmitter and the angle receiver exceeds a predetermined threshold value. The limit circuit 5 contains a limit element 6 with a positive response threshold and a limit element 7 with a negative response threshold and thus forms a window discriminator the positive and negative response threshold of which can be adjusted symmetrically to zero via a potentiometer 8. The limit elements 6 and 7 can be formed, for example, by Schmitt triggers. At the output of the limit element 6 an 'L' signal appears if the output voltage of the differential amplifier 4 present at its input has exceeded the set positive response threshold (limit). Conversely, at the output of the limit element 7 an 'L' signal appears if the output voltage exceeds the negative response threshold. If, therefore, the difference between the set-point angle and the control-point angle is greater than the threshold range set by the potentiometer 8, depending on the polarity of the angular difference at one or the other output of the limit circuit 5 an 'L' signal (error signal) appears.

The voltage obtained from the tap of the potentiometer 2 is also fed to the input of a differentiating section 9 the output voltage of which corresponds to the rate of change of the input signal and thus to the rate of turning of the rudder. The output voltage of the differentiating section 9 is fed to the input of a limit circuit 10 the configuration of which corresponds to the limit circuit 5 and which, therefore, is provided with a limit element 11 with a positive response threshold and with a limit element 12 with a negative response threshold. The positive and negative response threshold of the limit elements 11 and 12 can be adjusted symmetrically to zero via a potentiometer 13.

The output of the limit element 11 carries an 'H' signal (error signal) as long as the rudder is not being turned in the one direction at a minimum rate of turning predetermined by the response threshold. Similarly, the output of the limit element 12 carries an 'H' signal (error signal) as long as the rudder is not being turned in the other direction at a predetermined minimum rate of turning. As soon as the rudder is turned in one or the other direction at the predetermined minimum speed an 'L' signal appears at the output of the limit element 11 or 12.

The output signals of the two limit circuits 5 and 10 are fed to an evaluation circuit 14 which supplies a drive signal for an alarm generator if the angular difference between the angle transmitter and the angle receiver exceeds a predetermined amount and the rudder is not being turned at a predetermined minimum speed in the direction associated with the polarity of the angular difference. The evaluation circuit 14 contains two exclusive OR elements 15 and 16 and a NAND element 17 following these. The output of the limit element 6 is connected to the one input of the exclusive OR element 15 and the output of the limit element 11 to its other input whilst the output of the limit element 7 is connected to the one input of the exclusive OR element 16 and the output of the limit element 12 to its other input. One input of the NAND element 17 is connected to the output of the exclusive OR element 15 and its other input is connected to the output of the exclusive OR element 16. The logic signals supplied by the two limit circuits 5 and 10 are, therefore, linked in the evaluation circuit 14 in such a manner that an 'H' signal (drive signal) appears at the output of the NAND element 17 only when different logic signals are applied to one of the two exclusive OR elements 15 or 16, that is when they receive an error signal both from the limit circuit 5 ('L' signal) and from the limit circuit 10 ('H' signal). The alarm generator, not shown in detail in the drawing, is driven by the output signal of the evaluation circuit 14 via a NAND element 18 which supplies a triggering signal ('L' signal) to the alarm generator if an 'H' signal appears at all inputs. Apart from the input connected to the output of the evaluation circuit 14, the NAND element 18 also has two further inputs one of which is connected to the output of a switch-on unit 19 and the other one of which is connected to the output of a timing section 20.

A voltage supply source, provided for supplying the electronic components of the monitoring arrangement with power, supplies voltage to the switch-on unit 19, after closing the ON/OFF switch, which is fed to the individual components via the supply line 23. The switch-on unit 19 contains a trigger circuit 24 to which voltage is applied, after closing of the switch 22, via a delay section consisting of a resistor 25 and a capacitor 26. Thus, when the switch 22 is closed firstly the individual electronic components are supplied with supply voltage via the supply line 23. As long as the voltage at the input of the trigger circuit 24 has not yet reached the triggering threshold the output connected to the NAND element 18 carries an 'L' signal. After a period of time which is predetermined by the delay section the triggering voltage threshold is reached and consequently an 'H' signal appears at the output of the switch-on unit 19.

The timing section 20 is driven by a NAND element 27 one input of which is connected to the output of the limit element 6 and the other input of which is connected to the output of the limit element 7 of the limit circuit 5. The timing section 20 contains an oscillator 28, a binary counter 29 for counting the pulses supplied by the oscillator 28, and a decoding circuit 30 connected to the outputs of the binary counter and settable by a switch section 31. The switch contacts of the individual switches of the switch section 31 are connected to the inputs of a NAND element 32 the output of which is connected to one input of the NAND element 18.

The timing element 20 is activated if the limit circuit 5 supplies an error signal ('L' signal) since in this case an 'H' signal appears at the output of the NAND element 27 which starts up the oscillator 28 and enables the binary counter for counting the pulses subsequently supplied by the oscillator 28. The counter 29 is stopped if an 'H' signal appears at its 'Stop' input 33. The counter is reset if an 'H' signal is applied to its reset input 34. The 'Stop' input 33 is connected to the output of a NAND element 35 one input of which is connected to the output of the NAND element 27 and the other input of which is connected to the output of an inverter 36 the input of which is connected to the output of the NAND element 32. The reset input 34 is connected to the output of a NAND element 37 one input of which is connected to the output of the NAND element 27 and the other input of which is connected to the output of the switch-on unit 19.

After the timing section 20 has been activated by an 'L' signal (error signal) occurring at one of the two outputs of the limit circuit 5 the counter 29 counts the pulses supplied by the oscillator 28 until a count set by the switch section 31 is reached. When the set count is reached an 'H' signal appears at the output of the NAND element 32 and stops the counter via the inverter 36 and the NAND element 35, making it possible to trigger the alarm generator if there is a drive signal at the output of the evaluation circuit 14.

Thus the timing section 20 provides for the alarm generator to be triggered by a drive signal, appearing at the output of the evaluation circuit 14, only after a predetermined waiting period has elapsed. This waiting period is necessary since it takes some time (a few seconds) after a rudder angle has been preset until the steering gear has started up and turns the rudder at a certain minimum speed. If this period of time is not taken into consideration, a short-period alarm would be triggered if a greater change in the rudder angle is preset since in this case not only the limit circuit 5 but also the limit circuit 10 would deliver an error signal during the run-up time of the steering gear. The waiting period put into effect by the timing section 20 is selected to be such that, with proper operation of the steering gear, the rudder is turned at the required minimum speed so that, after the waiting period has elapsed, there is no longer a drive signal for the alarm generator at the output of the evaluation circuit 14 since in the meantime the limit circuit 10 no longer supplies an error signal.

If there is a point at which the steering gear jams and if this point occurs after the waiting period predetermined by the timing section 20, an alarm is triggered immediately since the timing section enables the drive signal to the alarm generator, occurring at the output of the evaluation circuit 14.

If the rudder is in a runaway condition due to a malfunction of the steering gear, without the handwheel having been operated, the alarm is also triggered. This is because the potentiometer 1 is not adjusted whilst the potentiometer 2 is adjusted in a direction which allows the angular error between the potentiometer 1 and 2 to become greater. After the error threshold determined by the limit circuit 5 has been reached the timing section 20 is activated. At the output of the evaluation circuit 14 a drive signal appears since either, because of too low a speed, neither of the two limit elements 11 and 12 responds or, due to the direction of rotation being wrong, the wrong limit element responds. After the waiting period preset by the timing section 20 has elapsed the alarm generator is then triggered.

For checking the operability of the monitoring arrangement the potentiometer 1 can be misadjusted with respect to the potentiometer 2 by means of a resistor 39 via a test key 38 to such an extent that an error signal appears at one of the two outputs of the limit circuit 5. The limit circuit 10 also supplies an error signal since the rudder is not being turned and, therefore, the potentiometer 2 is not being adjusted. Thus, after the waiting period predetermined by the timing section 20 has elapsed an alarm is triggered. The test key can, therefore, be used to check in a simple manner the operability of essential parts of the monitoring arrangement, including the potentiometers.

We claim:

1. Arrangement for monitoring a rudder control system, containing a transmitter for generating a set-point signal corresponding to the respective desired angular position of the rudder and facilities for turning the rudder subsequently to the angular position provided by the set-point signal, the actual angular position of the rudder being picked up by a receiver which supplies a corresponding control-point signal, further containing a first limit circuit (5) to which the difference between the set-point signal and the control-point signal is applied and which supplies an error signal if the applied difference between the set-point signal and the control-point signal exceeds a predetermined limit, a second limit circuit (10), which supplies an error signal corresponding to the turning rate of the rudder, an evaluation circuit (14) to which the output signals of the two limit circuits (5,10) are applied for supplying a drive signal for an alarm generator if two error signals are present, dependent upon an input signal coming from the first (5) and the second (10) limit circuits, and a delay circuit (20) responsive to said first limit circuit for enabling the alarm generator to be triggered by a drive signal, present at the output of the evaluation circuit (14), only after a predetermined period of time has elapsed during which an output has been provided by said first limit circuit, characterized by the provision of a differentiating circuit (9) to which the control-point signal is applied for producing a signal corresponding to the rate of change of the control-point signal and supplying it to the second limit circuit (10);

the provision in said second limit circuit of two limit elements (11,12), one for producing a first signal when the rate of change of said control point signal in a positive-going direction exceeds a predetermined minimum and otherwise producing a second signal, and the other for producing a first signal when the rate of change of said control-point in a negative-going direction exceeds a predetermined minimum and otherwise producing a second signal;

the provision in said first limit circuit of two limit elements (6,7), one of which (6) supplies an error signal when a positive signal limit is exceeded and the other one (7) of which supplies an error signal when a negative signal limit is exceeded;

provision of a pair of logic circuits (15,16), one for each polarity of error signal, in said evaluation circuit (14) for responding to the presence of an error signal from the limit element of said first limiting circuit relating to said polarity during the presence of said first signal from the limit element of said second limit circuit (10) corresponding to the same polarity;

provision of the error signals of the two limit elements (6,7) also at the same time to an additional logic circuit (27) for supplying an activation signal to the delay circuit (20), and provision of a final logic circuit (18) for producing an alarm signal in response to the output of said evaluation circuit (14) after the delay circuit (20) has provided a signal to said final logic circuit indicating that said delay circuit has been activated for a predetermined period.

2. Arrangement according to claim 1, characterized in that the evaluation circuit (14) contains two exclusive NOR elements (15, 16) and a NAND element (17) following these, the output of the one limit element (6) of the first limit circuit (5) is connected to the one input of the one exclusive NOR element (15) and the output of the one limit element (11) of the second limit circuit (10) to its other input, the output of the other limit element (7) of the first limit circuit (5) is connected to the one input of the other exclusive NOR element (16) and the output of the other limit element (12) of the second limit circuit (10) to its other input, and that the output of the one exclusive NOR element (15) is connected to the one input and the output of the other exclusive NOR element (16) to the other input of the NAND element (17), the output of which supplies the drive signal for the alarm generator.

3. Arrangement according to claim 1, characterized in that the delay circuit (20) is provided with a pulse generator (28), which can be started by the error signal, and a counter (29), which is fed by the pulse generator, and a decoding circuit (30), which follows the counter and which, after reaching a settable count of the counter, supplies a control signal which is used for enabling the NAND element (18) and for stopping the counter.

4. Arrangement according to claim 1, characterized in that means are provided for temporarily altering the set-point signal independently of a set-point signal provided as a steering instruction for the rudder control system, for the purpose of checking the operability of the monitoring arrangement.

* * * * *